(12) United States Patent
Chong et al.

(10) Patent No.: US 7,851,779 B2
(45) Date of Patent: Dec. 14, 2010

(54) MEDIUM FOR USE IN DATA STORAGE, THERMAL ENERGY STORAGE AND OTHER APPLICATIONS, WITH FUNCTIONAL LAYER MADE OF DIFFERENT MATERIALS

(75) Inventors: Tow Chong Chong, Singapore (SG); Zengbo Wang, Singapore (SG); Luping Shi, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 422 days.

(21) Appl. No.: 11/834,381

(22) Filed: Aug. 6, 2007

(65) Prior Publication Data
US 2008/0055970 A1    Mar. 6, 2008

Related U.S. Application Data

(60) Provisional application No. 60/835,439, filed on Aug. 4, 2006.

(51) Int. Cl.
*H01L 29/04* (2006.01)
*H01L 47/00* (2006.01)

(52) U.S. Cl. .................. 257/4; 257/2; 257/3; 257/5; 257/295; 257/E21.476; 257/E27.004; 257/E45.002; 438/95; 438/97; 438/672

(58) Field of Classification Search .............. 257/2, 257/3, 4, 5, 295, E21.476, E27.004, E45.002; 438/95, 97, 672
See application file for complete search history.

(56) References Cited

U.S. PATENT DOCUMENTS

| | | | |
|---|---|---|---|
| 5,768,075 A | 6/1998 | Bar-Gadda | |
| 5,942,342 A | 8/1999 | Hikosaka et al. | |
| 6,440,520 B1 | 8/2002 | Baglin et al. | |
| 6,849,349 B2 | 2/2005 | Klemmer et al. | |
| 6,882,488 B1 | 4/2005 | Albrecht et al. | |
| 7,067,207 B2 | 6/2006 | Kamata et al. | |
| 7,128,987 B2 | 10/2006 | Van De Veerdonk et al. | |
| 7,381,458 B2 * | 6/2008 | Kiyono | 428/64.1 |
| 7,463,573 B2 * | 12/2008 | Fan et al. | 369/126 |
| 2006/0006472 A1 * | 1/2006 | Jiang | 257/358 |

(Continued)

OTHER PUBLICATIONS

Chong, T.C. et al., Superlattice-like Structure for Pahse Change Optical Recording, Journal of Applied Physics, Apr. 2002, pp. 3981-3987, vol. 91, No. 7.

*Primary Examiner*—Dao H Nguyen
(74) *Attorney, Agent, or Firm*—Dinsmore & Shohl LLP

(57) ABSTRACT

A medium for use in data storage, thermal energy storage and other applications, the medium comprising a functional layer made of different materials. One embodiment provides a data storage medium. The data storage medium comprises a substrate and a data storage layer supported by the substrate. The data storage layer comprises a plurality of regions each capable of representing a digital value. The data storage layer is at least partly made of a first material and a second material different from the first material. The data storage layer comprises a pattern of discrete portions made of the second material lying in a plane defined by the data storage layer. The pattern is configured such that each region representing a digital value contains a portion made of the first material and at least one of the discrete portions made of the second material. Other embodiments provide a thermal energy storage medium and a sensing medium.

19 Claims, 15 Drawing Sheets

U.S. PATENT DOCUMENTS

2007/0267620 A1* 11/2007 Happ ........................... 257/4
2008/0230203 A1* 9/2008 Christ et al. ................. 165/10
2008/0303014 A1* 12/2008 Goux et al. .................... 257/3

* cited by examiner

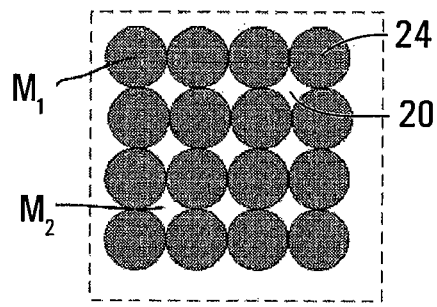
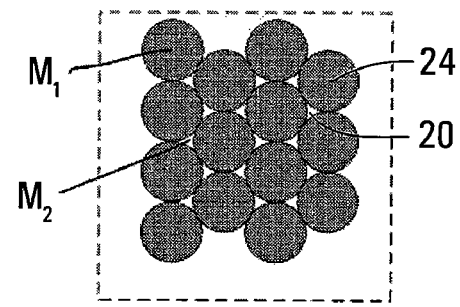
FIG. 3U  FIG. 3V
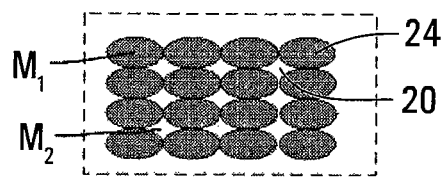
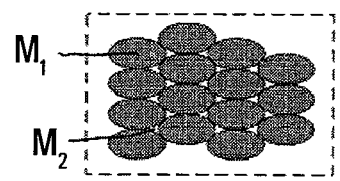
FIG. 3W  FIG. 3X

Etched: 10 nm SiO$_2$ / 25 nm ZnS-SiO2 / 25 nm Sb$_2$Te$_3$
Re-sputtered: 10 nm SiO$_2$ / 25 nm ZnS-SiO2 / 25 nm GeTe Etched: 10 nm SiO$_2$ / 25 nm ZnS-SiO2 / 25 nm Sb$_2$Te$_3$
Re-sputtered: 20 nm SiO$_2$ / 25 nm ZnS-SiO2 / 25 nm GeTe

MEDIUM FOR USE IN DATA STORAGE, THERMAL ENERGY STORAGE AND OTHER APPLICATIONS, WITH FUNCTIONAL LAYER MADE OF DIFFERENT MATERIALS

CROSS-REFERENCE TO RELATED APPLICATION

This application claims the benefit under 35 USC 119(e) of U.S. Provisional Patent Application No. 60/835,439 filed on Aug. 4, 2006 by Chong et al. and hereby incorporated by reference herein.

FIELD OF THE INVENTION

The present invention relates to media for use in data storage, thermal energy storage and other applications.

BACKGROUND

A data storage medium comprises a substrate supporting one or more layers made of different materials, including a data storage layer. For example, an optical data storage medium comprises a data storage layer adapted to optically store data, a magnetic data storage medium comprises a data storage layer adapted to magnetically store data, and a phase-change memory comprises a data storage layer adapted to store data on a basis of electrical resistivity values.

The data storage layer is typically made of a single material. This material, which may be a phase-change material (e.g., a chalcogenide material), a magnetic material or any other suitable material, has properties (e.g., optical, magnetic or electric properties) that enable the data storage layer to store data. As such, performance characteristics of the data storage layer, and thus of the data storage medium, greatly depend on and are limited by the properties of the material making up the data storage layer.

Limitations similar to those imposed by properties of a material making up a data storage layer of a data storage medium are often found in other types of media used for other purposes, such as, for example, thermal energy storage media for storing thermal energy and sensing media for sensing and detection applications.

Accordingly, there remains a need for improvements in data storage media, thermal energy storage media, sensing media, and other types of media to counter limitations imposed by material properties.

SUMMARY OF THE INVENTION

In accordance with one broad aspect, the present invention provides a data storage medium. The data storage medium comprises a substrate and a data storage layer supported by the substrate. The data storage layer comprises a plurality of regions each capable of representing a digital value. The data storage layer is at least partly made of a first material and a second material different from the first material. The data storage layer comprises a pattern of discrete portions made of the second material lying in a plane defined by the data storage layer. The pattern is configured such that each of said regions contains a portion made of the first material and at least one of the discrete portions made of the second material.

In accordance with another broad aspect, the present invention provides a method for manufacturing a data storage medium, the data storage medium comprising a data storage layer for storing data, the data storage layer comprising a plurality of regions each capable of representing a digital value. The method comprises: forming one or more layers on a substrate, the one or more layers including a precursory data storage layer that is made of a first material; etching at least one layer of the one or more layers, the at least one layer including the precursory data storage layer; and depositing a second material different from the first material into etched spaces of the precursory data storage layer to form a pattern of discrete portions that are made of the second material, the pattern being configured so that each of said regions of the data storage layer contains a portion made of the first material and at least one of the discrete portions that are made of the second material.

In accordance with yet another broad aspect, the present invention provides a thermal energy storage medium. The thermal energy storage medium comprises a substrate and a thermal energy storage layer supported by the substrate and adapted to store thermal energy. The thermal energy storage layer is at least partly made of a first material and a second material different from the first material. The thermal energy storage layer comprises a pattern of discrete portions made of the second material lying in a plane defined by the thermal energy storage layer.

In accordance with yet another broad aspect, the present invention provides a sensing medium. The sensing medium comprises a substrate and a sensing layer supported by the substrate and adapted to sense a stimulus. The sensing layer is at least partly made of a first material and a second material different from the first material. The sensing layer comprises a pattern of discrete portions made of the second material lying in a plane defined by the sensing layer.

These and other aspects of the invention will become apparent to those of ordinary skill in the art upon review of the following description of embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which.

As will be appreciated, the description and drawings are only for purposes of illustration of example embodiments of the present invention and are an aid for understanding. They are not intended to be a definition of the limits of the invention.

DETAILED DESCRIPTION

Figure 1:
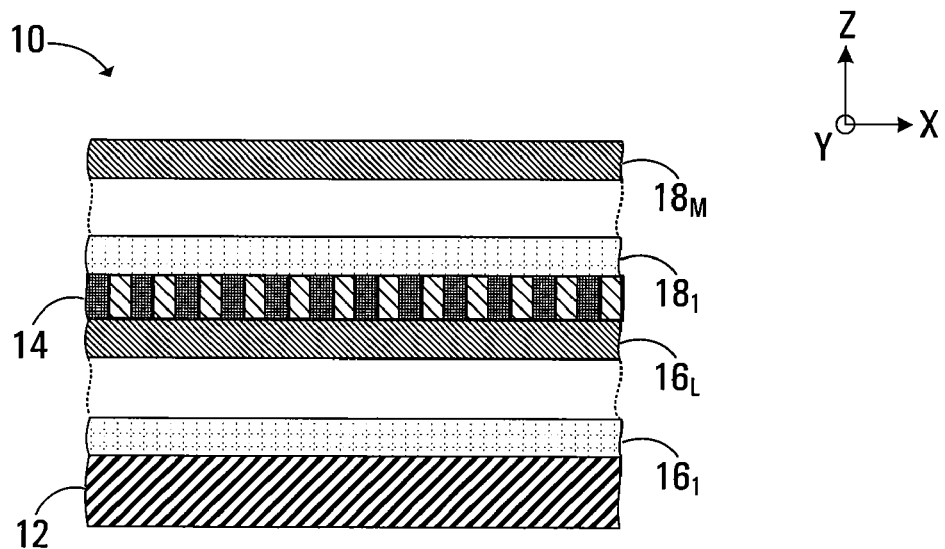
FIG. 1 illustrates a data storage medium exemplary of an embodiment of the present invention.

FIG. 1 illustrates a data storage medium 10 exemplary of an embodiment of the present invention. For example, data storage medium 10 may be an optical data storage medium for optically storing data, a magnetic data storage medium for magnetically storing data, or a phase-change memory (PCM, also known as phase-change random access memory (PRAM)) for storing data on a basis of electrical resistivity values.

Data storage medium 10 includes a substrate 12 and a data storage layer 14 supported by substrate 12. Depending on its nature, data storage medium 10 may also include one or more layers $16_1 \ldots 16_L$ between substrate 12 and data storage layer 14 and/or one or more layers $18_1 \ldots 18_M$ above data storage layer 14, thereby forming a multi-layer structure. Each of the one or more layers $16_1 \ldots 16_L$ and/or the one or more layers $18_1 \ldots 18_M$ may be a protective layer, a dielectric layer, a reflective layer, an insulation layer or any other layer that may be desirable to include in data storage medium 10. Thus, in various embodiments, data storage layer 14 may be supported by substrate 12 directly on substrate 12, or on one of the one or more layers $16_1 \ldots 16_L$ that are supported by substrate 12. Although in this embodiment data storage medium 10 includes a single data storage layer (i.e., data storage layer 14), data storage medium 10 may include plural data storage layers in other embodiments.

Substrate 12 supports data storage layer 14 and, if present, one or more layers $16_1 \ldots 16_L$ and/or one or more layers $18_1 \ldots 18_M$. Substrate 12 may be made of any suitable material. For example, this material may be selected to provide substrate 12 with a desired surface planarity (e.g., a surface roughness of less than 1 nm) and to be compatible with processes used to manufacture data storage medium 10 (e.g., processes and possibly chemicals used to make data storage layer 14 should not cause damage to or erosion of substrate 12). Examples of materials that may be used for substrate 12 include silicon, silicon oxide (SiOx), polycarbonate, polymethyl methacrylate (PMMA), amorphous polyolefin, norbornene type resin, ultraviolet curable resin, paper, ceramic and glass. It will be appreciated that these examples are presented for illustrative purposes only since, as mentioned above, substrate 12 may be made of any suitable material.

Data storage layer 14 is adapted to store data. For example: in embodiments where data storage medium 10 is an optical data storage medium, data storage layer 14 is adapted to optically store data; in embodiments where data storage medium 10 is a magnetic data storage medium, data storage layer 14 is adapted to magnetically store data; and in embodiments where data storage medium 10 is a phase-change memory, data storage layer 14 is adapted to store data on a basis of electrical resistivity values.

To provide its storage function, data storage layer 14 has a plurality of regions each capable of representing a digital value (e.g., a bit). A region of data storage layer 14 is capable of representing a digital value if it actually represents a digital value that can be read by a reading unit (as described below) or if it will represent a digital value after being subjected to a stimulus applied by a writing unit (as described below). In other words, the regions of data storage layer 14 that are capable of representing digital values exist whether data storage medium 10 is blank (i.e., no data has been written onto data storage layer 14) or stores or has stored data (i.e., data has been written onto data storage layer 14). The digital value represented by a given region of data storage layer 14 depends on a property, or a change in a property, of that given region. For instance, this property may be an optical property (e.g., optical reflectivity), a magnetic property (e.g., magnetization), or an electrical property (e.g., electrical resistivity).

In order to write data onto data storage layer 14, a writing unit (not shown) is used to subject each of a plurality of areas of data storage layer 14 to a stimulus. The writing unit may have different functionality in various embodiments. For example: in embodiments where data storage medium 10 is an optical data storage medium, the writing unit may be adapted to subject each of a plurality of areas of data storage layer 14 to a light beam (e.g., a laser beam); in embodiments where data storage medium 10 is a magnetic data storage medium, the writing unit may be adapted to subject each of a plurality of areas of data storage layer 14 to a magnetic field or a laser beam; and in embodiments where data storage medium 10 is a phase-change memory, the writing unit may be adapted to subject each of a plurality of areas of data storage layer 14 to an electric current. Each area of data storage layer 14 that is subjected to the stimulus applied by the writing unit is altered, at least in part, by this stimulus in order to create a region representing a digital value. Each area of data storage layer 14 that is subjected to the stimulus applied by the writing unit may have a size that is sufficient to contain a region representing a digital value.

Reading data from data storage layer 14 is effected by using a reading unit (not shown) that is similarly adapted to read digital values represented by regions of data storage layer 14. The reading unit may comprise various components in various embodiments. For example, depending on the nature of data storage medium 10, the reading unit may comprise an optical reading unit, a magnetic reading unit, or an electrical reading unit. In some embodiments, the writing unit and the reading unit may be part of separate devices, while in other embodiments, the writing unit and the reading unit may be part of a single device.

Figure 2:
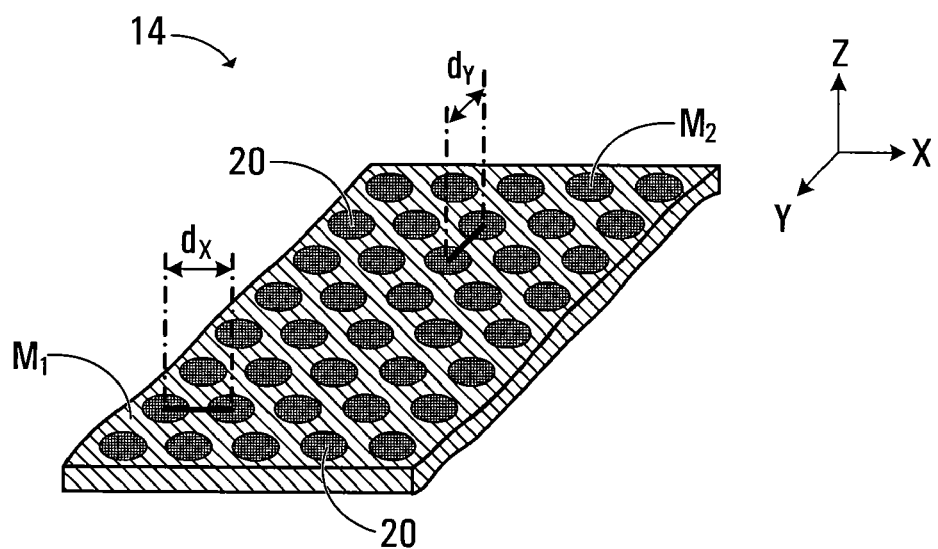
FIG. 2 illustrates a data storage layer of the data storage medium of FIG. 1, the data storage layer being made of a first material and a second material different from the first material, the data storage layer comprising a pattern of discrete portions that are made of the second material.

With additional reference to FIG. 2, and exemplary of an embodiment of the present invention, data storage layer 14 is made of a first material $M_1$ and a second material $M_2$ that is different from material $M_1$. More particularly, data storage layer 14 comprises a pattern of discrete portions 20 that are made of material $M_2$. A "pattern", as used herein, refers to a designed configuration, as opposed to a random or chance configuration. Discrete portions 20 that are made of material $M_2$ lie in a plane defined by data storage layer 14, i.e., a plane normal to a Z-axis defining a thickness of data storage layer 14. In this embodiment, each of discrete portions 20 that are made of material $M_2$ is surrounded by material $M_1$. Data storage layer 14 may have any suitable thickness. For example, in some embodiments, the thickness may be between 2 and 40 nm, preferably between 15 and 25 nm.

Materials $M_1$ and $M_2$ have different compositions and different properties, including different optical, electrical, magnetic, chemical, mechanical, and/or thermal properties. Any suitable materials may be used as materials $M_1$ and $M_2$ depending on the nature of data storage medium 10. Materials $M_1$ and $M_2$ may be selected such that they tend to neither react with nor diffuse into each other during use of data storage medium 10.

In embodiments where phase change is used as a basis to store data on data storage medium 10, at least one of material $M_1$ and material $M_2$ may be a phase-change material. The phase-change material may be composed of at least one element selected from a group consisting of Te, Ge, Sb, Bi, Pd, Sn, As, Ag, In, Se, S, Si and P. For example, the phase-change material may be a chalcogenide material. In some cases, the phase-change material may be part of one of two public families of phase-change materials, e.g., pseudo-binary alloys on the GeTe—$Sb_2Te_3$ tieline or quaternary AgInSbTe alloys. Examples of phase-change materials that may be used include, without being limited to: GeTe, InSe, InSeTl, InSeTlCo, GeTeAs, GeTeSnAu, InTe, InSeTe, InSbTe, SbSeTe, GaSbTe, $Ge_3Sb_2$, $Sb_2Te_3$, $Sb_{70}Te_{30}$, $Sb_{85}Te_5$, $Sb_{78}Te_{22}$, $Sb_{88}Te_{12}$, $Ga_{9.6}Sb_{90.4}$, $Ga_{12}Sb_{88}$, $(InSb)_{80}(GaSb)_{20}$, $Ge_8In_2$, $Ge_1Sb_1Te_2$, $Ge_1Sb_4Te_7$, $Ge_2Sb_2Te_5$, $Ge_1Sb_2Te_4$, $Ge_{14}Sb_{29}Te_{57}$, $Ge_{22}Sb_{22}Te_{56}$, $Ge_5Sb_{66.5}Te_{28.5}$, $Ge_1Sb_1Bi_1Te_4$, InSbTe, AgInSbTe, $Ag_3In_5Sb_{60}Te_{32}$, $Ag_5In_5Sb_{60}Te_{30}$, $Mn_5Ge_3Ga_4Sb_{70}Te_{18}$, and $(Sb_xTe_{100-x})(Ga_ySb_{100-y})_z$ where $35 \leq x \leq 80$; $40 \leq y \leq 50$; and $0.05 \leq z \leq 0.9$. Also, in some cases, the phase-change material may be a phase-change magnetic material. The phase-change magnetic material may be composed of at least one element selected from a group consisting of Te, Ge, Sb, Bi, Pd, Sn, As, Ag, In, Se, S, Si and P, and at least one element selected from a group consisting of Fe, Co and Ni. Examples of phase-change magnetic materials that may be used include, without being limited to: FeGeSbTe, CoGeSbTe, NiGeSbTe, $Fe(Sb_2Te_3)$, $Co(Sb_2Te_3)$, $Ni(Sb_2Te_3)$, FeGeSb, CoGeSb, NiGeSb, $Fe(Sb_{70}Te_{30})$, $Co(Sb_{70}Te_{30})$, $Ni(Sb_{70}Te_{30})$, FeInSbTe, CoInSbTe, and NiInSbTe.

In some embodiments, material $M_1$ is a first phase-change material and material $M_2$ is a second phase-change material that is different from the first phase-change material.

In other embodiments, one of materials $M_1$ and $M_2$ is a phase-change material and the other one of materials $M_1$ and $M_2$ is not a phase-change material. The material which is not a phase-change material may be any suitable material. For example, in some embodiments, the material which is not a phase-change material may be a dielectric material. Examples of dielectric materials that may be used include, without being limited to: oxide, nitride, carbide, fluoride such as $SiO_2$, SiO, $Al_2O_3$, $ZrO_2$, $GeO_2$, $In_2O_3$, $TeO_2$, $TiO_2$, $Ta_2O_5$, $MoO_3$, $WO_3$, $Si_3N_4$, AlN, BN, TiN, ZnS, CdS, CdSe, ZnTe, AgF, $PdF_2$, and SiC. As another example, in some embodiments, the material which is not a phase-change material may be a magnetic material. The magnetic material may be composed of at least one element selected from a group consisting of Fe, Co and Ni. Examples of magnetic materials that may be used include, without being limited to: $CO_5S_m$, FePt, CoPt, $Fe_{14}Nd_2B$, Co/Pt, FePd, Co/Pd, $CO_3Pt$, MnAl, $CoPt_3$, CoCrPt, and $CoCr_{20}Pt_{15}$.

Thus, in embodiments where phase change is used as a basis to store data on data storage medium 10, various combinations are possible.

For example, in some embodiments, material $M_1$ is a first phase-change material and material $M_2$ is a second phase-change material that is different from the first phase-change material. In a particular case, material $M_1$ is a first phase-change magnetic material and $M_2$ is a second phase-change magnetic material that is different from the first phase-change magnetic material. In another particular case, one of materials $M_1$ and $M_2$ is a phase-change magnetic material and the other one of materials $M_1$ and $M_2$ is a phase-change material that is not a phase-change magnetic material.

In other embodiments, one of materials $M_1$ and $M_2$ is a phase-change material and the other one of materials $M_1$ and $M_2$ is a dielectric material.

In yet other embodiments, one of materials $M_1$ and $M_2$ is a phase-change material and the other one of materials $M_1$ and $M_2$ is a magnetic material. In a particular case, one of materials $M_1$ and $M_2$ is a phase-change magnetic material and the other one of materials $M_1$ and $M_2$ is a magnetic material.

It is to be understood that the above examples are presented for illustrative purposes only and that materials $M_1$ and $M_2$ may be various other materials in other embodiments.

The pattern of discrete portions 20 that are made of material $M_2$ is configured so that each region of data storage layer 14 that is capable of representing a digital value is at least partly made of material $M_1$ and material $M_2$. In some embodiments, each region of data storage layer 14 that is capable of representing a digital value contains a portion made of material $M_1$ and at least one of discrete portions 20 that are made of material $M_2$. In other embodiments, each region of data storage layer 14 that is capable of representing a digital value contains a portion made of material $M_1$ and plural ones of discrete portions 20 that are made of material $M_2$. By having each region of data storage layer 14 that is capable of representing a digital value being at least partly made of material $M_1$ and material $M_2$, data storage layer 14 can be viewed as having "modulated" properties and performance characteristics that depend on properties of material $M_1$ and properties of material $M_2$.

More particularly, in this embodiment, the pattern of discrete portions 20 that are made of material $M_2$ is a two-dimensional array. The two-dimensional array is characterized by a pitch $D_x$ in a first direction and a pitch $D_y$ in a second direction perpendicular to the first direction. The pitch $D_x$ refers to a distance, measured in the first direction, between corresponding points (e.g., centers) of adjacent ones of discrete portions 20 that are made of material $M_2$. Similarly, pitch $D_y$ refers to a distance, measured in the second direction, between corresponding points of adjacent ones of discrete portions 20 that are made of material $M_2$.

In some cases, the pattern of discrete portions 20 that are made of material $M_2$ may be designed so as to satisfy the following condition:

$$nD_x \times mD_y < A$$

$$n \geq 1; m \geq 1$$

where: A is an area of data storage layer 14 that is subjected to the stimulus applied by the aforementioned writing unit for each bit of data; n is a number of repetitions of pitch $D_x$ within that area; and m is a number of repetitions of pitch $D_y$ within that area. Embodiments where there are five (5) or more repetitions of the pitch $D_x$ and five (5) or more repetitions of the pitch $D_y$ within an area of data storage layer 14 that is subjected to the stimulus applied by the writing unit (i.e., $n \geq 5$; $m \geq 5$) may produce a region of data storage layer 14 contained in that area exhibiting "effective" properties and performance characteristics that reflect properties of materials $M_1$ and $M_2$ in a desirable manner. While the above condition may be satisfied in some embodiments, it may not be satisfied in other embodiments where other conditions may be satisfied.

In this embodiment, each of discrete portions 20 that are made of material $M_2$ has a circular shape in the plane defined by data storage layer 14. This circular shape may have any suitable dimensions. For instance, in some embodiments, the circumference, radius or diameter of the circular shape of each of discrete portions 20 that are made of material $M_2$ may be between 1 nm and 100 μm.

While in this embodiment the pattern of discrete portions 20 that are made of material $M_2$ is a two-dimensional array having a particular configuration and each discrete portion 20 has a circular shape, in other embodiments the pattern of discrete portions 20 that are made of material $M_2$ may have any other designed configuration and each discrete portion 20 may have any other desired shape.

Figure 3A:
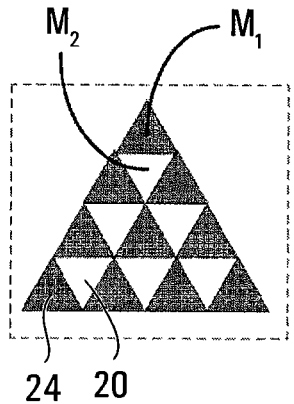
FIGS. 3A to 3X illustrate examples of other planar configurations for the data storage layer.

For instance, FIGS. 3A to 3X illustrate examples of other configurations that the pattern of discrete portions 20 that are made of material $M_2$ may have in other embodiments.

Figure 3B:
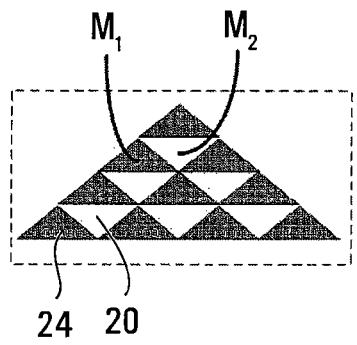
Figure 3C:
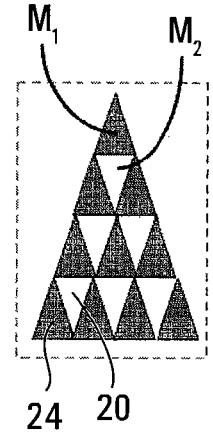

In FIGS. 3A to 3C, each discrete portion 20 made of material $M_2$ has a triangular shape in the plane defined by data storage layer 14. In these examples, data storage layer 14 can also be viewed as comprising a pattern of discrete portions 24 that are made of material $M_1$, each discrete portion 24 also having a triangular shape in the plane defined by data storage layer 14. For instance, the triangular shape may be an equilateral triangle (FIG. 3A) or an isosceles triangle (FIGS. 3B and 3C).

Figure 3D:
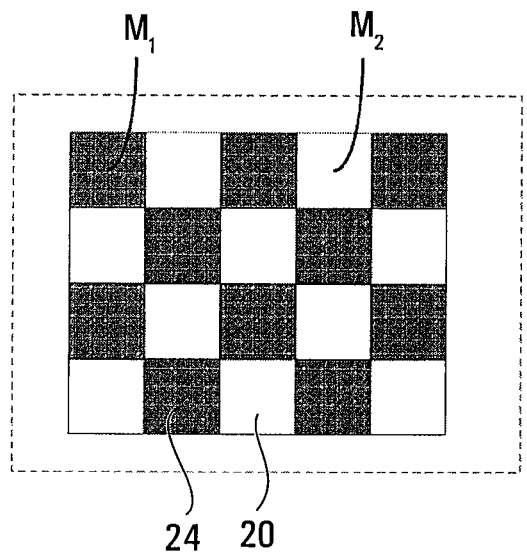
Figure 3E:
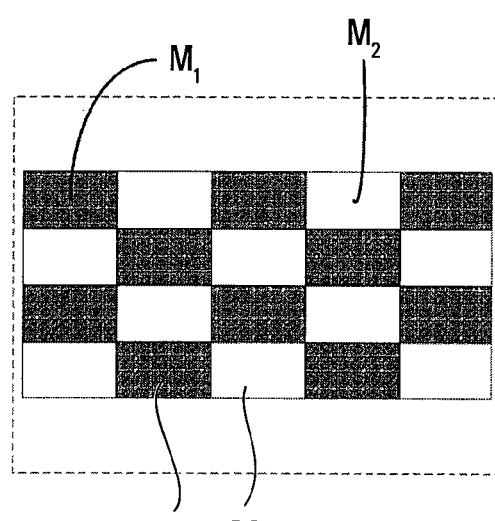

In FIGS. 3D and 3E, each discrete portion 20 made of material $M_2$ has a rectangular shape in the plane defined by data storage layer 14. In these examples, data storage layer 14 can also be viewed as comprising a pattern of discrete portions 24 that are made of material $M_1$, each discrete portion 24 also having a rectangular shape in the plane defined by data storage layer 14. For instance, the rectangular shape may be a square (FIG. 3D) or an oblong rectangle (FIG. 3E).

Figure 3F:
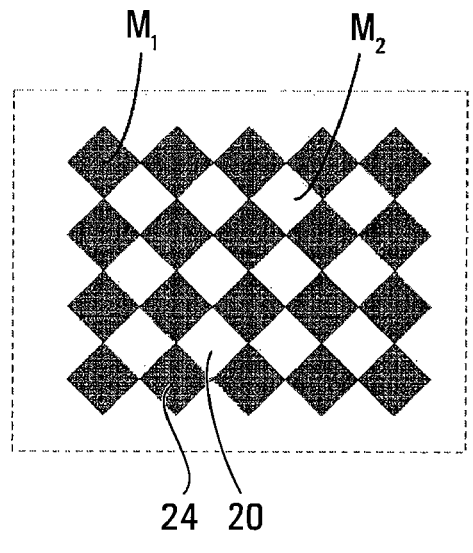

In FIG. 3F, each discrete portion 20 made of material $M_2$ has a diamond shape in the plane defined by data storage layer 14. In this example, data storage layer 14 can also be viewed as comprising a pattern of discrete portions 24 that are made of material $M_1$, each discrete portion 24 also having a diamond shape in the plane defined by data storage layer 14.

Figure 3G:
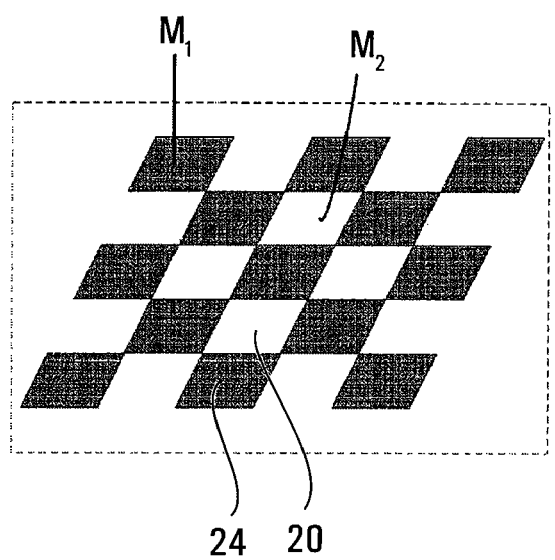

In FIG. 3G, each discrete portion 20 made of material $M_2$ has a parallelogram shape in the plane defined by data storage layer 14. In this example, data storage layer 14 can also be viewed as comprising a pattern of discrete portions 24 that are made of material $M_1$, each discrete portion 24 also having a parallelogram shape in the plane defined by data storage layer 14.

Figure 3H:
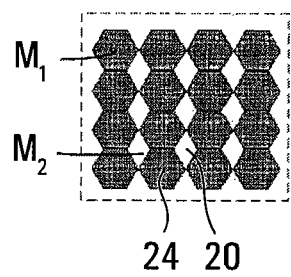
Figure 3I:
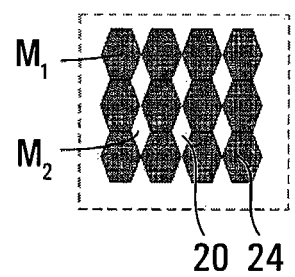
Figure 3J:
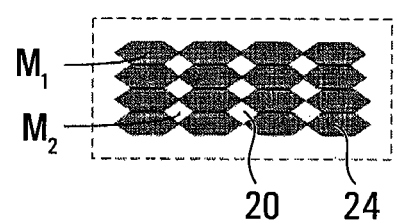

In FIGS. 3H to 3J, each discrete portion 20 made of material $M_2$ has a triangular shape in the plane defined by data storage layer 14. In these examples, data storage layer 14 can also be viewed as comprising a pattern of discrete portions 24 that are made of material $M_1$, each discrete portion 24 having an hexagonal shape in the plane defined by data storage layer 14.

Figure 3K:
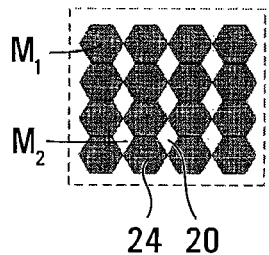
Figure 3L:
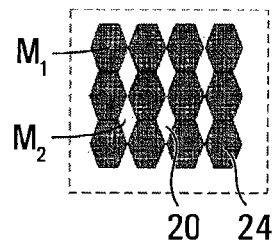
Figure 3M:
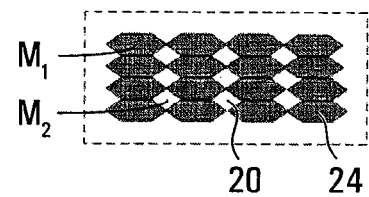

In FIGS. 3K to 3M, each discrete portion 20 made of material $M_2$ has a diamond shape in the plane defined by data storage layer 14. In these examples, data storage layer 14 can also be viewed as comprising a pattern of discrete portions 24 that are made of material $M_1$, each discrete portion 24 having an hexagonal shape in the plane defined by data storage layer 14.

Figure 3N:
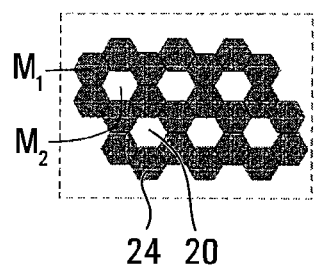
Figure 3O:
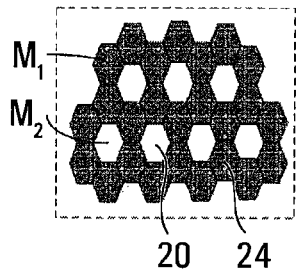
Figure 3P:
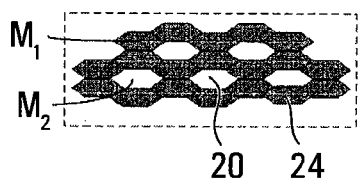

In FIGS. 3N to 3P, each discrete portion 20 made of material $M_2$ has an hexagonal shape in the plane defined by data storage layer 14. In these examples, data storage layer 14 can also be viewed as comprising a pattern of discrete portions 24 that are made of material $M_1$, each discrete portion 24 also having an hexagonal shape in the plane defined by data storage layer 14.

Figure 3Q:
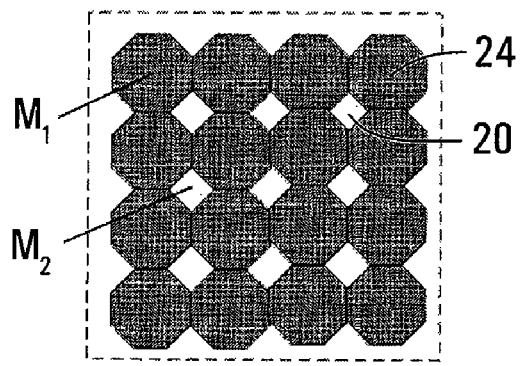
Figure 3S:
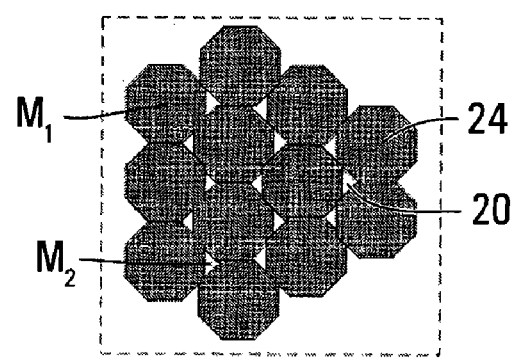
Figure 3R:
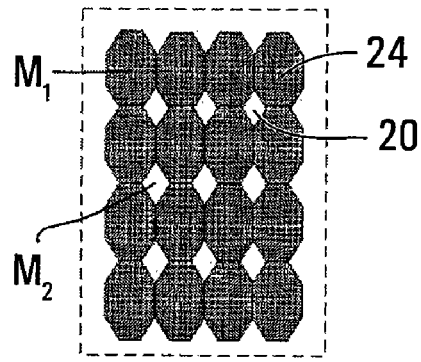

In FIGS. 3Q and 3R, each discrete portion 20 made of material $M_2$ has a rectangular shape or a diamond shape, respectively, in the plane defined by data storage layer 14. In these examples, data storage layer 14 can also be viewed as comprising a pattern of discrete portions 24 that are made of material $M_1$, each discrete portion 24 having an octagonal shape in the plane defined by data storage layer 14.

Figure 3T:
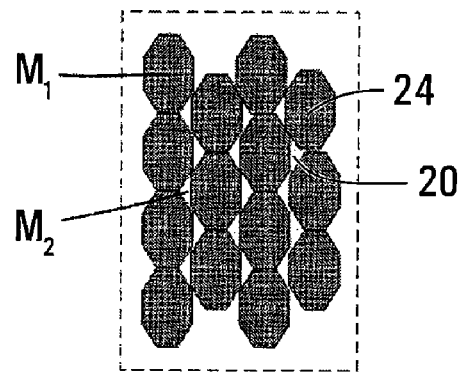

In FIGS. 3S and 3T, each discrete portion 20 made of material $M_2$ has a triangular shape in the plane defined by data storage layer 14. In these examples, data storage layer 14 can also be viewed as comprising a pattern of discrete portions 24 that are made of material $M_1$, each discrete portion 24 having an octagonal shape in the plane defined by data storage layer 14.

In FIGS. 3U and 3V, each discrete portion 20 made of material $M_2$ has a shape having a curved perimeter with cusps, in the plane defined by data storage layer 14. For instance, the shape of each discrete portion 20 made of material $M_2$ may have a hypocycloid-like perimeter with four (4) cusps (FIG. 3U) or three (3) cusps (FIG. 3V). In these examples, data storage layer 14 can also be viewed as comprising a pattern of discrete portions 24 that are made of material $M_1$, each discrete portion 24 having a circular shape in the plane defined by data storage layer 14.

In FIGS. 3W and 3X, each discrete portion 20 made of material $M_2$ has a shape having a curved perimeter with cusps, in the plane defined by data storage layer 14. For instance, the shape of each discrete portion 20 made of material $M_2$ may have a hypocycloid-like perimeter with four (4) cusps (FIG. 3W) or three (3) cusps (FIG. 3X). In these examples, data storage layer 14 can also be viewed as comprising a pattern of discrete portions 24 that are made of material $M_1$, each discrete portion 24 having an elliptical shape in the plane defined by data storage layer 14.

In these examples, the shape of each discrete portion 20 made of material $M_2$ may have any suitable dimensions. For instance, in some embodiments, the length of each side of the polygonal shapes considered in FIGS. 3A to 3T may be between 3 nm and 100 μm. Similarly, the length of each segment of the curved perimeter with cusps of the shapes considered in FIGS. 3U to 3X may be between 3 nm and 100 μm.

It will be appreciated that the above examples are presented for illustrative purposes only since, it is recalled, the pattern of discrete portions 20 that are made of material $M_2$ may have any designed configuration and each discrete portion 20 may have any desired shape.

Since the pattern of discrete portions 20 that are made of material $M_2$ is characterized in that each region of data storage layer 14 that is capable of representing a digital value is at least partly made of material $M_1$ and material $M_2$, data storage layer 14 can be viewed as having modulated properties and performance characteristics that depend at least to some extent on one or more of the following factors:
  a. Composition and properties of material $M_1$ and composition and properties of material $M_2$;
  b. The pitch $D_x$ and the pitch $D_y$ between adjacent ones of discrete portions 20 that are made of material $M_2$;
  c. A ratio of a quantity of material $M_1$ to a quantity of material $M_2$ in a rectangular area having sides with lengths respectively corresponding to the pitch $D_x$ and the pitch $D_y$,
  d. Shapes of boundaries between material $M_1$ and discrete portions 20 that are made of material $M_2$ (i.e., the shapes of discrete portions 20 that are made of material $M_2$ in the plane defined by data storage layer 14). These shapes may play an important role in producing the modulated properties and performance characteristics of data storage layer 14. For example, in embodiments where data storage layer 14 is adapted to optically store data on a basis of phase change, nucleation may often start at edges of an area of data storage layer 14 that is subjected to a light beam. In these cases, different shapes of boundaries between material $M_1$ and discrete portions 20 that are made of material $M_2$ may provide different initial growth rates which in turn can provide different crystallization speeds for areas of data storage layer 14 that are subjected to a light beam.

Various properties and performance characteristics of data storage layer 14 can be modulated by virtue of the pattern of discrete portions 20 that are made of material $M_2$.

For example, in embodiments where data storage layer 14 is adapted to optically store data on a basis of phase change, or in embodiments where data storage medium 10 is a phase-change memory for storing data on a basis of electrical resistivity values, one or more of the following properties and performance characteristics of data storage layer 14 may be modulated: crystallization speed, re-crystallization speed, crystallization temperature, electrical resistivity, nucleation time, complete erase time (CET), thermal conductivity, thermal diffusivity, heat capacity, effective dielectric constant, jitter, carrier-to-noise ratio (CNR), activation energy (Ea), refractive index, and extinction coefficient.

As another example, in embodiments where data storage layer 14 is adapted to magnetically store data, one or more of the following properties and performance characteristics of data storage layer 14 may be modulated: effective magnetic permeability, medium coercivity, magnetic reluctance, magnetic saturation, and magnetic anisotropy.

Figure 4:
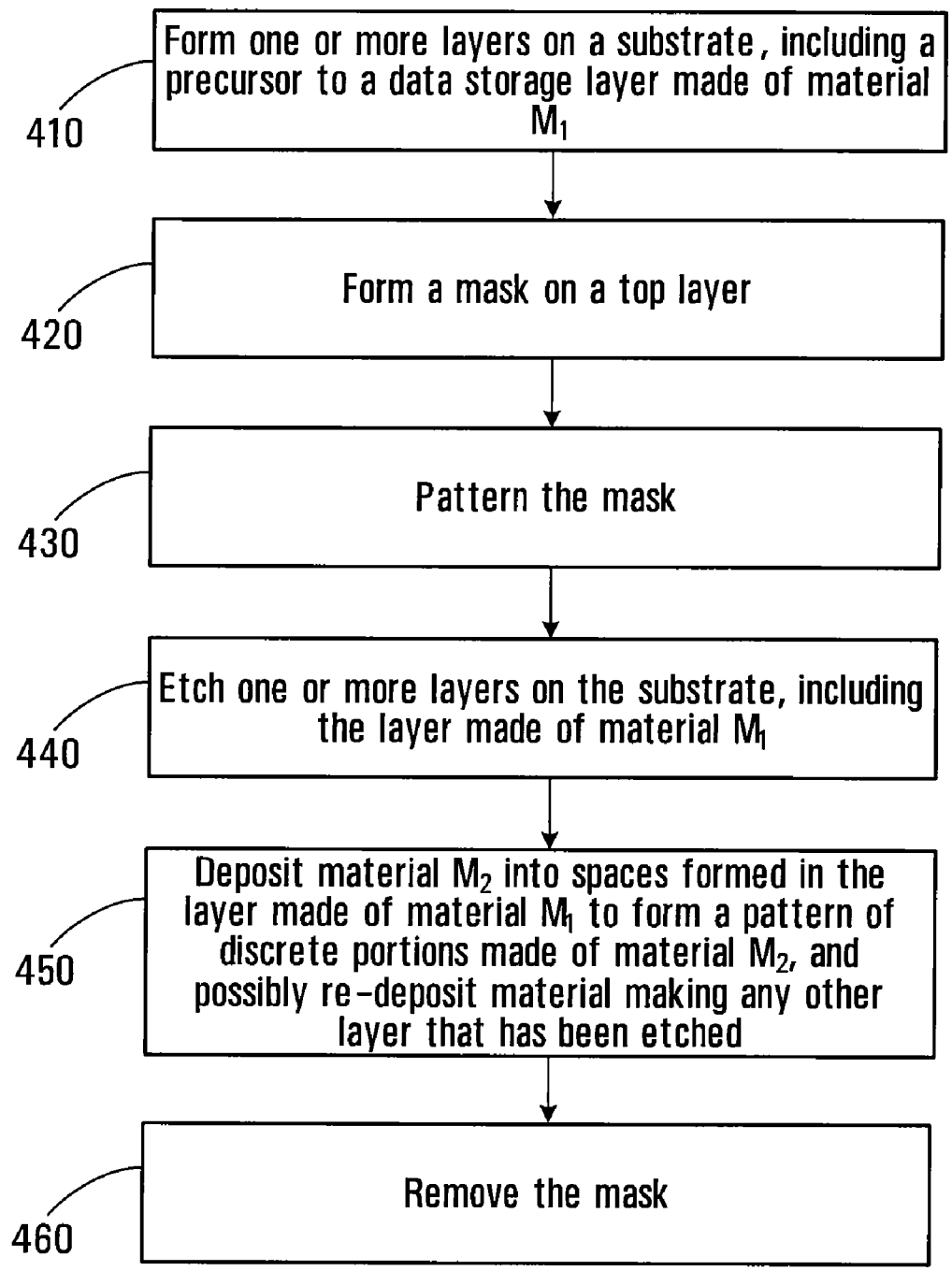
FIG. 4 is a flowchart illustrating an example process that may be used to manufacture the data storage medium.

Turning now to FIG. 4, there is shown an example of a process that can be used to manufacture data storage medium 10.

At step 410, one or more layers are formed on substrate 12, thereby creating a precursor to data storage medium 10. These one or more layers include a precursor to data storage layer 14, which is made of material $M_1$. Depending on the nature of data storage medium 10, these one or more layers may also include the aforementioned one or more layers $16_1 \ldots 16_L$ and/or one or more layers $18_1 \ldots 18_M$. A deposition process may be used to effect this step. The deposition process may be a chemical deposition process or a physical deposition process. For example, in various embodiments, sputtering, ion planting, thermal deposition, electron beam deposition, and pulsed laser deposition processes may be used. In particular, a sputtering process may be efficient for this step.

At step 420, a mask is formed on a top surface of the precursor to data storage medium 10. The mask may comprise a resist layer (e.g., a photoresist layer or an electron-beam resist layer), a hardmask layer or a combination thereof. A hardmask layer (e.g., made of Ni, Cr, Cu, etc.) may be necessary when a resist layer is insufficient to protect elements of the precursor to data storage medium 10 during etching (described below). In some cases, the mask may comprise two resist layers to provide an undercut feature for a lift-off process.

At step 430, the mask is patterned to enable subsequent formation of the pattern of discrete portions 20 that are made of material $M_2$ of data storage layer 14. Various processes may be used to effect this step, including a photolithography process, an electron beam lithography process, and a laser interference lithography process.

At step 440, after the mask has been patterned, one or more layers of the precursor to data storage medium 10 are etched. Etching is stopped at the precursor to data storage layer 14 that is made of material $M_1$ (e.g., at a bottom of that layer) to allow subsequent provisioning of material $M_2$ in that layer. This can be effected by accurately controlling the etching depth and using an appropriate etching rate. Various etching processes may be used for this step. For example, in various embodiments, wet chemical etching, reactive ion etching, and ion milling etching processes may be employed to effect this step.

At step 450, after etching, material $M_2$ is deposited into spaces formed in the precursor to data storage layer 14 in order to form the pattern of discrete portions 20 that are made of material $M_2$, thereby forming data storage layer 14. In addition, in embodiments where the precursor to data storage medium 10 includes the aforementioned one or more layers $18_1 \ldots 18_M$ on top of data storage layer 14, these one or more layers $18_1 \ldots 18_M$ will have been etched at step 440. In these embodiments, one or more materials making these one or more layers $18_1 \ldots 18_M$ are then re-deposited. Deposition processes such as those mentioned above in connection with step 410 may be used to effect this step At step 460, the mask and material re-deposited on the mask are removed. For example, this may be done by a lift-off process followed by a dry stripper process. Upon completing this step, one or more other manufacturing operations may be performed in order to obtain data storage medium 10 in its final form.

In view of the foregoing, it will be appreciated that, by virtue of being made of material $M_1$ and material $M_2$ which is distributed into the pattern of discrete portions 20, data storage layer 14 can be viewed as having modulated properties and performance characteristics that it may not have if it were made of a single material. This may result in data storage medium 10 having enhanced performance characteristics compared to other types of data storage media.

EXAMPLES

For illustrative purposes, a practical example of a data storage medium such as data storage medium 10 will now be described. It is emphasized that this example is presented for illustrative purposes only and is not to be interpreted in any limiting manner.

As further described below, this example is based on experimental work in which a data storage layer of a data storage medium was made of two phase-change materials, namely $Sb_2Te_3$ and GeTe, "sandwiched" in a plane defined by the data storage layer. The GeTe material was distributed into a pattern of portions with a circular shape, referred to as "dots", in the plane defined by the data storage layer. The diameter of each dot was controlled in the range from 280 nm to 450 nm.

Figure 5:
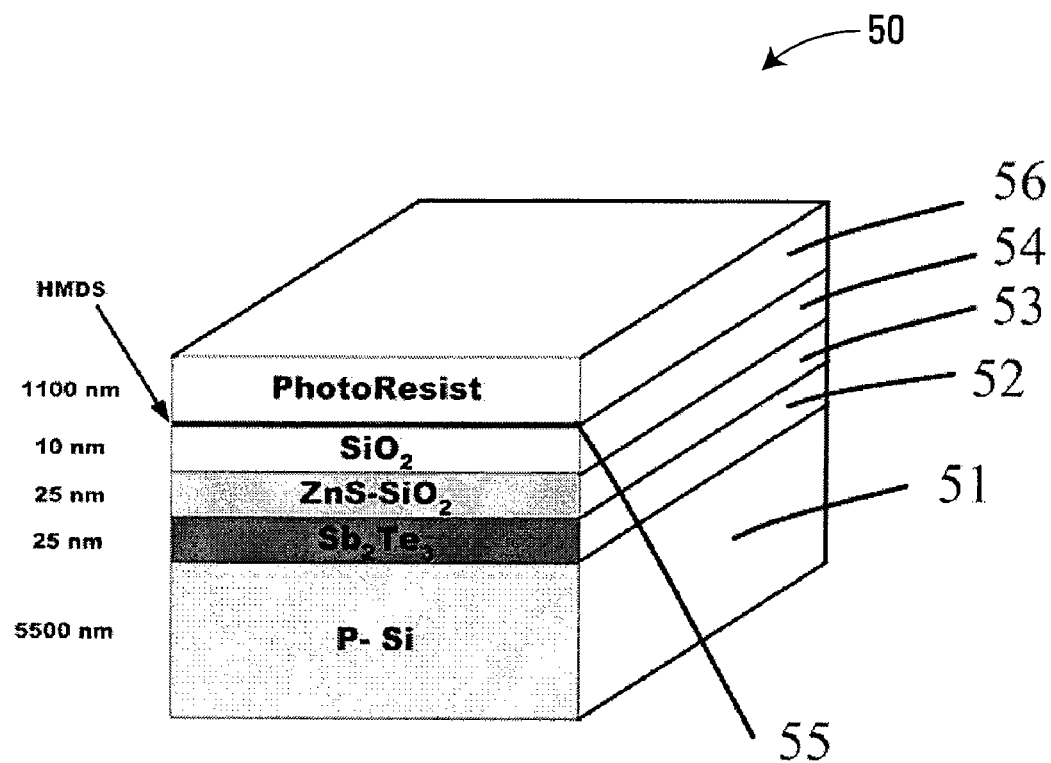
FIG. 5 illustrates a multi-layer structure prepared during experimental work to manufacture a data storage medium in accordance with an embodiment of the present invention.

With reference to FIG. 5, a multi-layer medium structure 50 was prepared by a sputtering system. More particularly, a P-Type silicon substrate 51 was immersed in a buffered-HF solution for about thirty (30) minutes to completely remove a top native oxide layer and was subsequently cleaned with standard RCA cleaning procedures. The sputtering system used has three (3) independent process chambers and three (3) sputtering power sources (two DCs and one RF). A $Sb_2Te_3$ film 52 was sputtered by DC magnetron sputtering, while a $ZnS$—$SiO_2$ layer 53 and a $SiO_2$ layer 54 were sputtered by RF magnetron sputtering. The $ZnS$—$SiO_2$ layer 53 was used to protect the underlying $Sb_2Te_3$ film 52 and the $SiO_2$ layer 54 was used to protect both the $ZnS$—$SiO_2$ layer 53 and the $Sb_2Te_3$ film 52 from being wet-etched by PG Remover used during a lift-off process. It is noted that PG Remover employed in this example wet-etch both $ZnS$—$SiO_2$ and $Sb_2Te_3$ films. It has a higher etch rate for $ZnS$—$SiO_2$ than for $Sb_2Te_3$. On top of the $SiO_2$ layer 54, an hexamethyldisalizane (HMDS) prime was coated by evaporation in a vacuum chamber which helped to improve adhesion between a photoresist layer 56 and the $SiO_2$ layer 54. The photoresist layer 56 was a PFI 26A photoresist layer spincoated at 6000 rpm for about 45 seconds. It had a thickness of about 1.1 μm. Table I below summarizes main parameters used for preparation of the multi-layer medium structure 50.

TABLE I

| Material | Parameters |
| --- | --- |
| $Sb_2Te_3$ | DC sputter: PC1/15 sccm/0.15 kw, Rate: 1.824 nm/s |
| ZnS—$SiO_2$ | RF sputter: PC2/15 sccm/2.0 kw, Rate: 4.043 nm/s |
| $SiO_2$ | RF sputter: PC2/20 sccm/1.0 kw, Rate: 0.30 nm/s |
| GeTe | DC sputter: PC3/15 sccm/0.15 kW Rate: 1.851 nm/s |
| PFI-26A | Spin coater: 6000 rpm, 45 secs, Baking: 100° C. 1 min |

Figure 6:
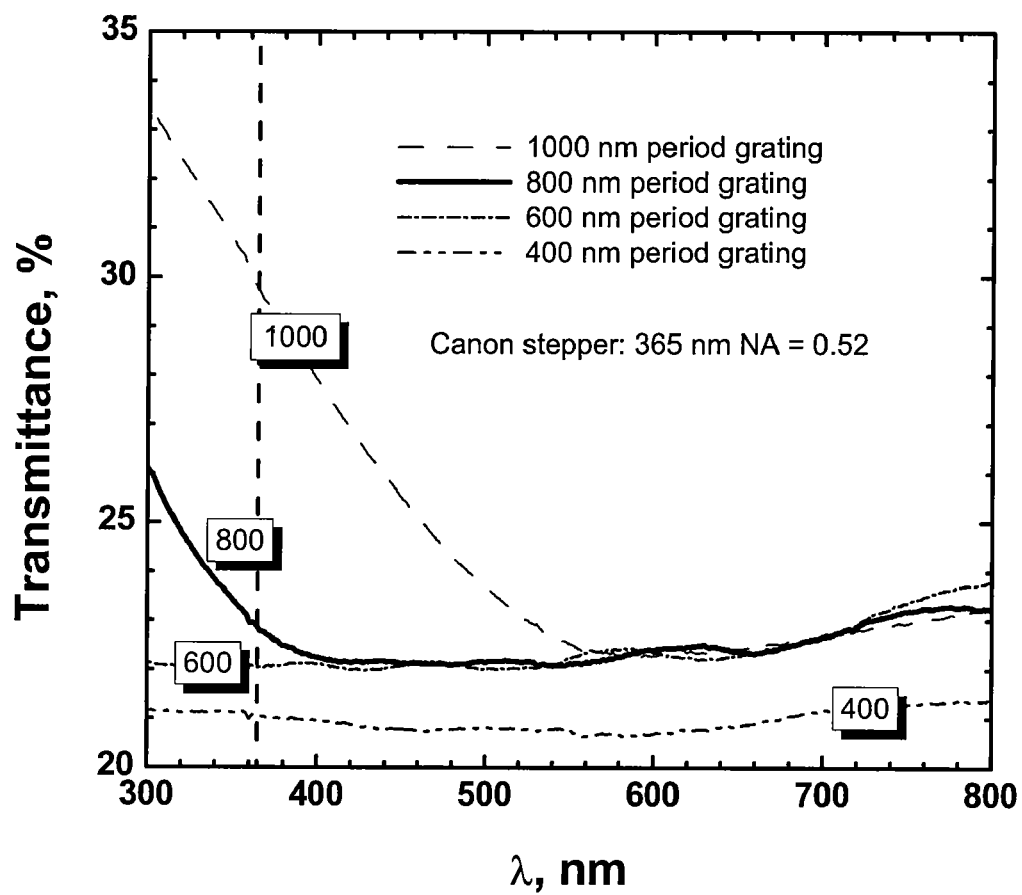
FIG. 6 is a graph showing measured transmission spectrums of gratings of a photomask used during the experimental work.

After it was prepared, the multi-layer medium structure 50 was exposed to a stepper where a photomask was used. The used photomask had grating structures with four (4) different periods, namely 1000 nm, 800 nm, 600 nm and 400 nm. Measured transmission spectrums for the gratings are shown in FIG. 6.

Figure 7A:
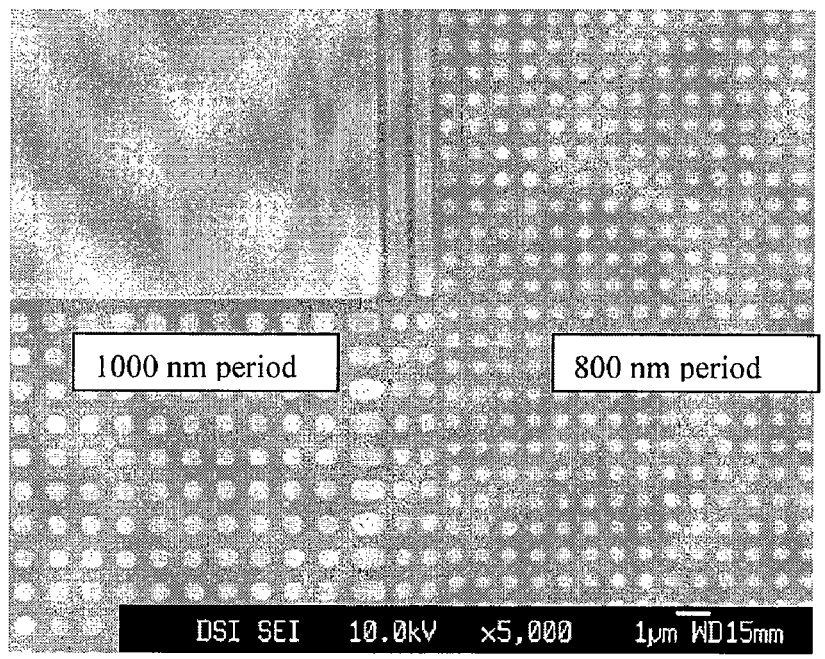
FIGS. 7A and 7B show scanning electron microscope (SEM) images of resist patterns with different periods after exposure and develop, obtained during the experimental work.
Figure 7B:
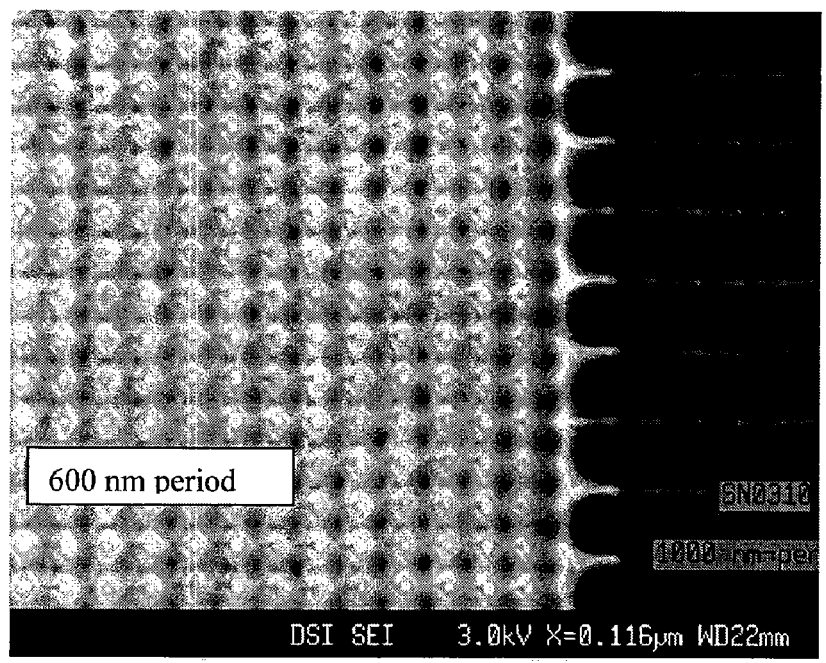

FIGS. 7A and 7B show examples of resist patterns obtained at a laser fluence of 120 mJ/cm$^2$) for different periods. As can see seen, clearly defined dot patterns can be readily prepared for 1000 nm and 800 nm periods, while for 600 nm and 400 nm periods the pattern quality is poor due to optical diffraction effects. The groove was 300 nm and 200 nm in size for 600 nm and 400 nm periods while the i-line stepper wavelength was 365 nm. The optical diffraction phenomenon becomes obvious under these cases when d<λ. The size of dots can be controlled by varying exposure fluence and develop time. Generally, when the laser fluence increases or the develop time increases, dots becomes smaller. In this example work, it was found that a minimum achievable dot size is about 280 nm for the PFI-26A resist. Further reduction of the dot size is rather difficult for PFI-26A since its minimum thickness by spin coater is around 1.0 μm. In order to prepare smaller dots, it may be envisaged to use thinner resists such as PFI-235A, PFI-88 and maP-205. However, it should be noted that different develop/remover solvents could have different etching properties to materials used.

The prepared resist patterns served as protective layers for a reactive ion etching (RIE) process. In this example work, it was found that all used materials, i.e., $SiO_2$, ZnS—$SiO_2$, $Sb_2Te_3$ and GeTe, can be etched by $CF_4$+Ar gas. Etching parameters are summarized in Table II below.

TABLE II

| Material | Conditions | Etch rate | Remarks |
| --- | --- | --- | --- |
| $SiO_2$ | Gas: CHF3 (45 sccm) RF power: 250 V ICP power: 0 V Chamber pressure: 20 | 100 nm for 130 secs. = 0.7692 nm/s | Step to remove top Silcon Oxide layer (10 nm: 15 secs) |
| ZnS(80%)—$SiO_2$ (20%)—MO | Gas: CF4 (45 sccm) (15 sccm) RF power: 250 V ICP power: 0 V Chamber pressure: 20 | 0.203 nm/s | Step to remove ZnS—$SiO_2$ and $Sb_2Te_3$. (50 nm: 2 mins 30 secs) |
| $Sb_2Te_3$ | Gas: CF4 (45 sccm) + Ar (15 sccm) RF power: 250 V ICP power: 0 V Chamber pressure: 20 | 1.774 nm/s | |

Figure 8A:
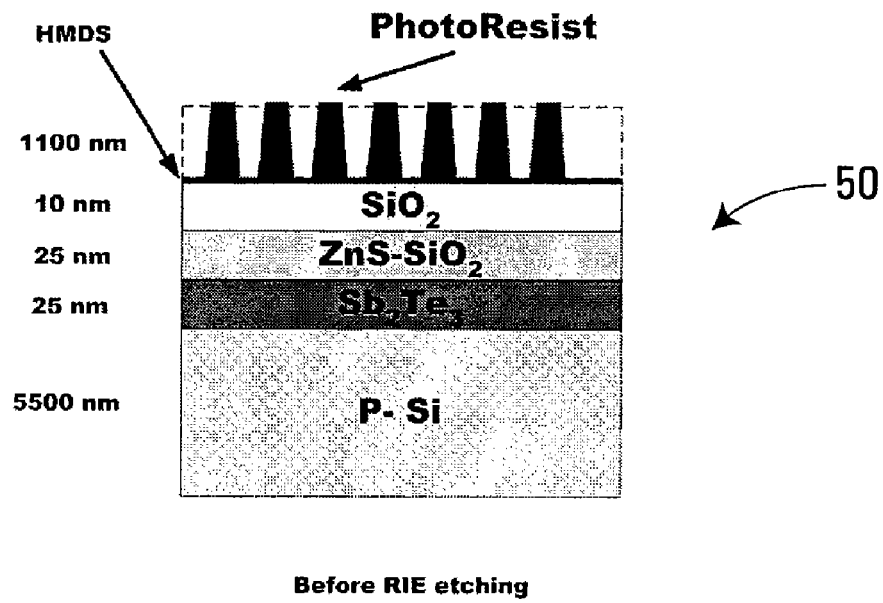
FIGS. 8A and 8B respectively illustrate the multi-layer medium structure of FIG. 5 before and after a reactive ion etching (RIE) process employed during the experimental work.
Figure 8B:
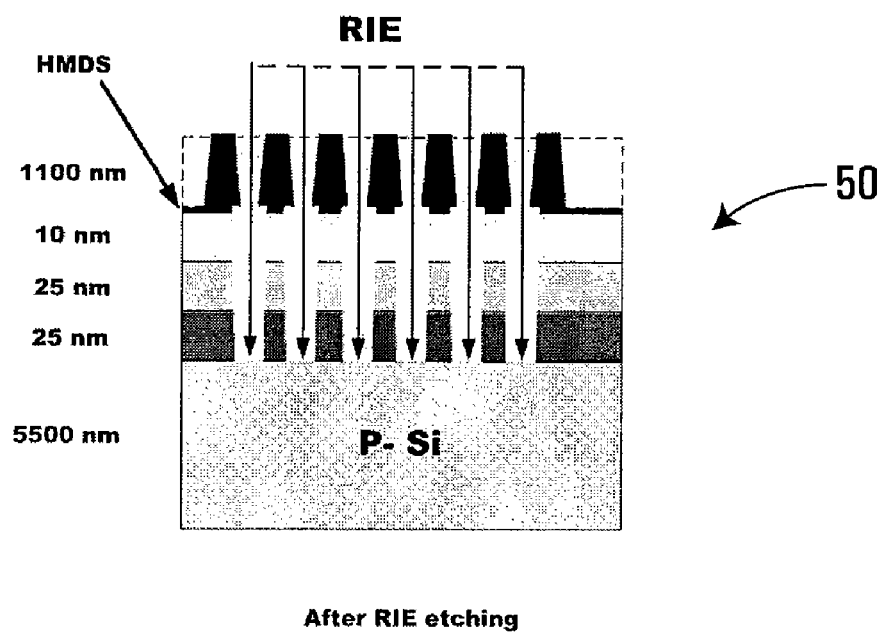
Figure 9A:
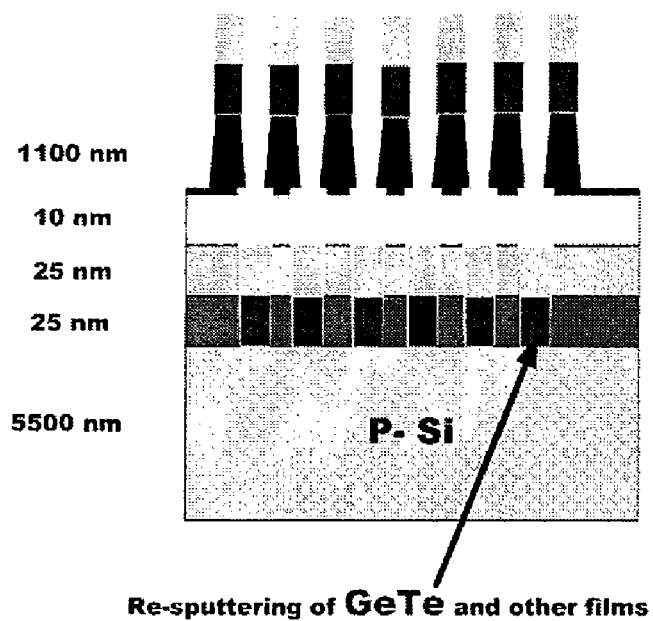
FIGS. 9A and 9B respectively illustrate re-deposition and lift-off processes employed during the experimental work.
Figure 9B:
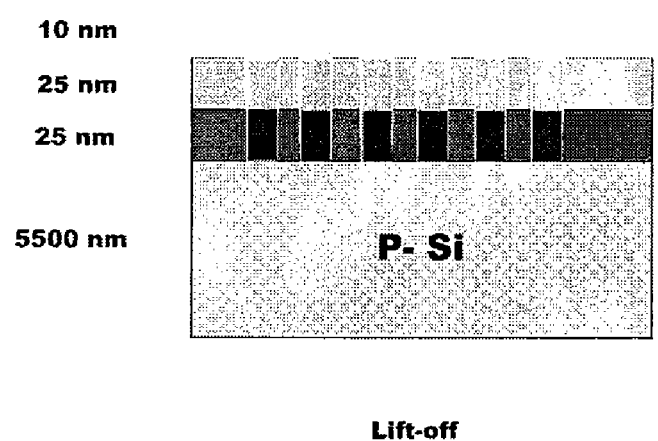

FIGS. 8A and 8B illustrate the multi-layer medium structure 50 before and after the RIE process. The RIE process removed away 10-nm $SiO_2$, 25-nm ZnS—$SiO_2$ and 25-nm $Sb_2Te_3$ films from unprotected regions. As shown in FIG. 9A, these etched regions were then sputtered with 25 nm of GeTe, 25 nm of ZnS—$SiO_2$ and 10 nm of $SiO_2$. Finally, as shown in FIG. 9B, the sample was subjected to a lift-off process, to obtain a data storage medium with a data storage layer made of the sandwiched $Sb_2Te_3$ and GeTe materials.

The lift-off process was found to be the most difficult step in this example work. To completely remove the resist mask, the sample was firstly immersed in PG-Remover solution for more than 12 hours at 60° temperature. The samples were then put into a fresh PG-remover solution in an ultrasonic bath for at least 45 minutes. The resist residual could not be completely removed after the wet-lift off process. This is believed to be mainly due to the change of photoresist chemical properties during the RIE process, in which the top surface is heated up by reactive ion flux (although the back of the sample is cooled down by helium). In order to remove the resist residuals, a stripper system with $O_2$ plasma was used. The final step was repeated until the residuals were completely removed (taking about 30 minutes). Table III below presents parameters used for $O_2$ stripping.

TABLE III

| Gas | Pressure | RF power | ICP |
| --- | --- | --- | --- |
| $O_2$ (90 sccm) + $N_2O$ (10 sccm) | 0.160 or | 250 W | 50 V |

Figure 10A:
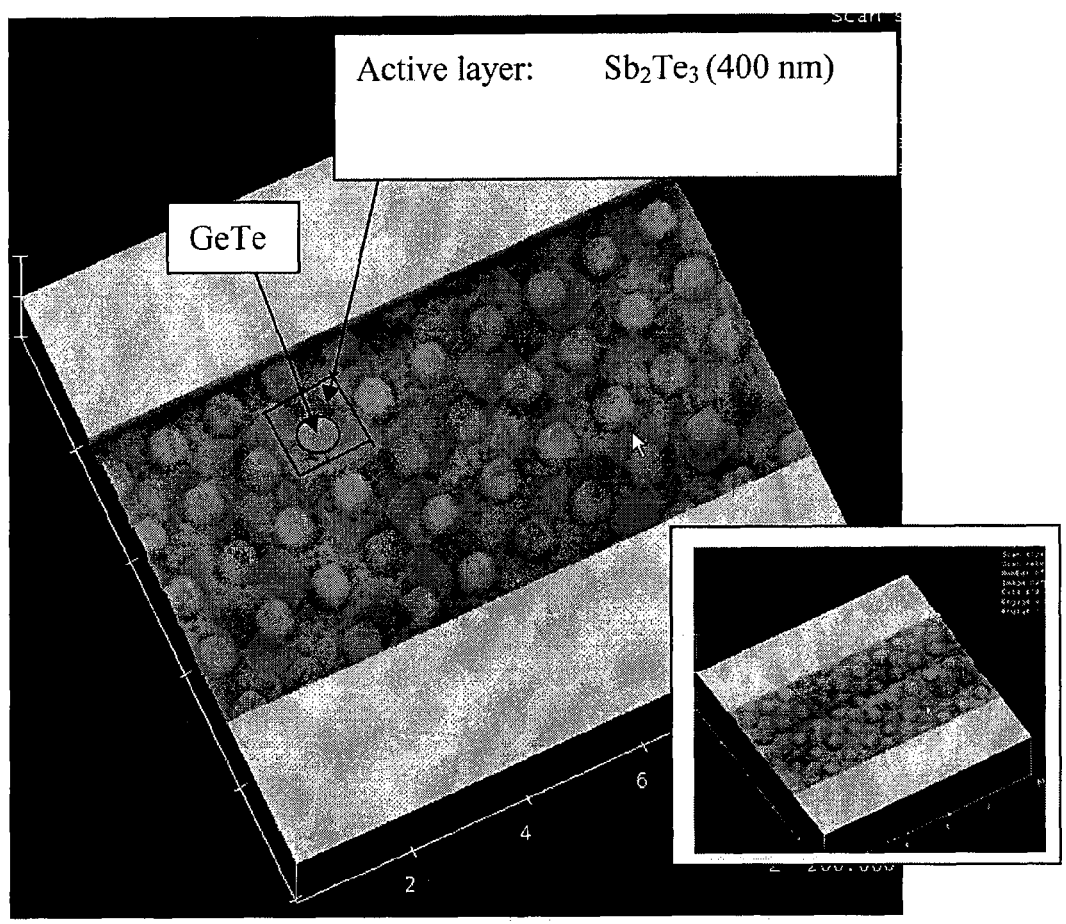
FIGS. 10A and 10B show atomic force microscope (AFM) images of samples of data storage media obtained during the experimental work.
Figure 10B:
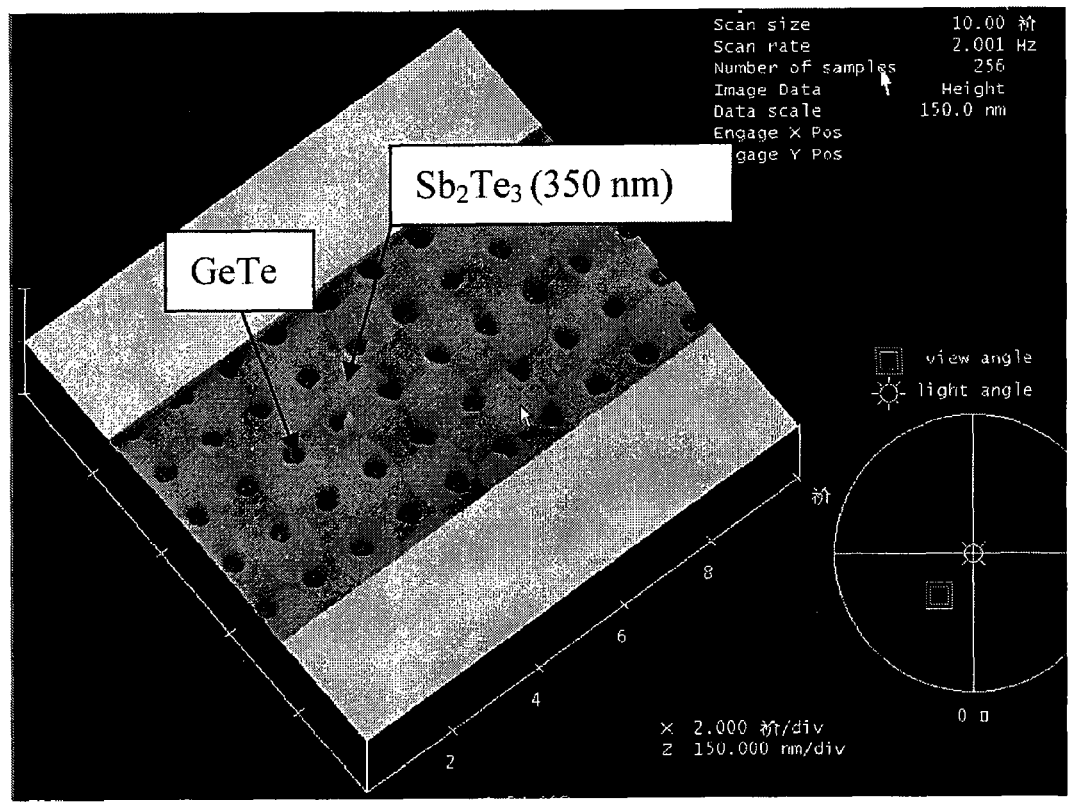

A completed sample is shown in FIG. 10A. As can be seen, the sandwiched $Sb_2Te_3$ dot is about 400 nm in size. The removal of resist residual is complete and the surface is clean. FIG. 10B shows another example in which the re-sputtering process was slightly different from that in FIG. 10A. Here, the $SiO_2$ re-sputtering thickness was increased to 20 nm. In this case, hole-shape structures were obtained.

It is reiterated that the above-considered practical example is presented for illustrative purposes only and is not to be interpreted in any limiting manner.

While embodiments considered previously herein relate to data storage, a composite medium having a structure similar to that of data storage medium 10 considered above may be used for purposes other than data storage.

For example, exemplary of another embodiment of the present invention, a thermal energy storage medium constructed in a manner similar to data storage medium 10 may be provided. In such an embodiment, the thermal energy storage medium, which can be used for heating or cooling purposes, comprises a thermal energy storage layer adapted to store thermal energy. The thermal energy storage layer has a structure similar to that of data storage layer 14 of data storage medium 10. That is, the thermal energy storage layer is made of a first material $M_1'$ and a second material $M_2'$ different from material $M_1'$, where material $M_2'$ forms a pattern of discrete portions that lies in a plane defined by the thermal energy storage layer (similar to the pattern of discrete portions 20 that are made of material $M_2$ of data storage layer 14). Any suitable materials may be used as materials $M_1'$ and $M_2'$. For example, at least one of material $M_1'$ and material $M_2'$ may be a phase-change material. The phase-change material may be composed of at least one element selected from a group consisting of Te, Ge, Sb, Bi, Pd, Sn, As, Ag, In, Se, S, Si and P. By virtue of being made of material $M_1'$ and material $M_2'$ which is distributed into the pattern of discrete portions, the thermal energy storage layer can be viewed as having modulated thermal properties (e.g., heat capacity, thermal conductivity, etc.) and performance characteristics that it may not have if it were made of a single material. This may result in the thermal energy storage medium having enhanced performance characteristics compared to other types of thermal energy storage media.

As another example, exemplary of another embodiment of the present invention, a sensing medium constructed in a manner similar to data storage medium 10 may be provided. In such an embodiment, the sensing medium, which can be used for sensing or detecting purposes (e.g., optical sensing, signal detection, etc.), comprises a sensing layer adapted to sense a stimulus (e.g., light, an electric signal, pressure, or any other stimulus that the sensing medium is designed to sense). The sensing layer has a structure similar to that of data storage layer 14 of data storage medium 10. That is, the sensing layer is made of a first material $M_1''$ and a second material $M_2''$ different from material $M_1''$, where material $M_2''$ forms a pattern of discrete portions that lies in a plane defined by the sensing layer (similar to the pattern of discrete portions 20 that are made of material $M_2$ of data storage layer 14). Any suitable materials may be used as materials $M_1''$ and $M_2''$. For example, at least one of material $M_1''$ and material $M_2''$ may be a phase-change material. The phase-change material may be composed of at least one element selected from a group consisting of Te, Ge, Sb, Bi, Pd, Sn, As, Ag, In, Se, S, Si and P. By virtue of being made of material $M_1''$ and material $M_2''$ which is distributed into the pattern of discrete portions, the sensing layer can be viewed as having modulated properties and performance characteristics that it may not have if it were made of a single material. This may result in the sensing medium having enhanced performance characteristics compared to other types of sensing media.

These examples illustrate some applications in which a composite medium having a structure similar to that of data storage medium 10 considered above may be used. Such composite medium may be used in various other applications.

Figure 11:
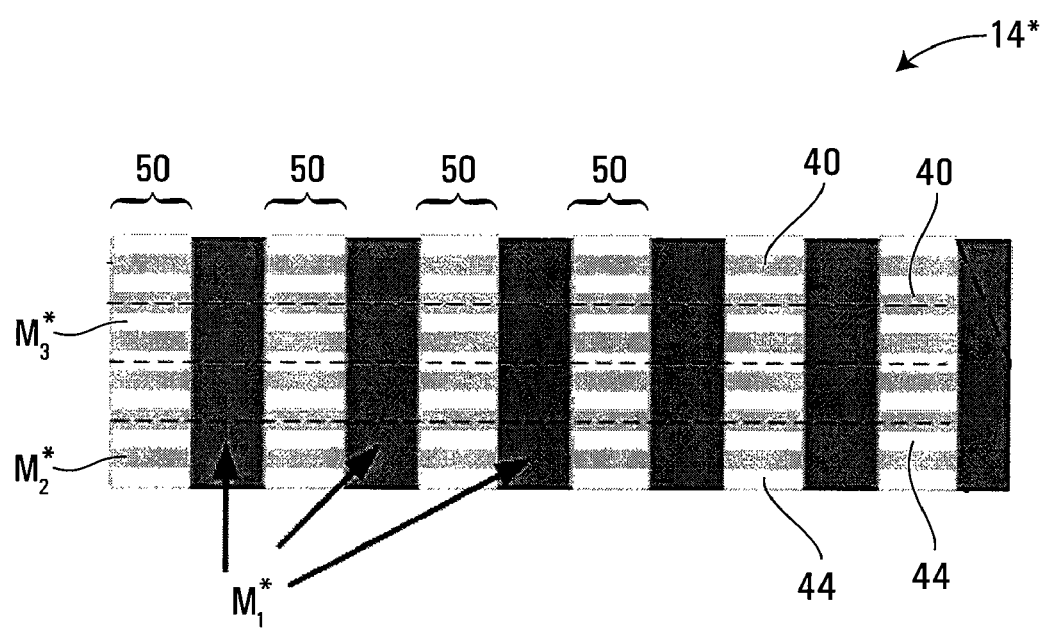
FIG. 11 illustrates a functional layer of a composite medium in accordance with an alternative embodiment of the present invention.

In some embodiments, data storage layer 14 of data storage medium 10 described above, the thermal energy storage layer of the thermal energy storage medium mentioned above, and the sensing layer of the sensing medium mentioned above may be made of more than two materials. In particular, FIG. 11 illustrates a functional layer 14* of a composite medium in accordance with an embodiment of the present invention. Functional layer 14* implements a main function of the composite medium. For example: in embodiments where the composite medium is a data storage medium (such as data storage medium 10 considered above), functional layer 14* is a data storage layer (such as data storage layer 14 considered above); in embodiments where the composite medium is a thermal energy storage medium, functional layer 14* is a thermal energy storage layer; in embodiments where the composite medium is a sensing medium, functional layer 14* is a sensing layer; and so on.

In this embodiment, functional layer 14* is made of three (3) materials, namely a first material $M_1^*$, a second material $M_2^*$ and a third material $M_3^*$. More particularly, functional layer 14* comprises a plurality of patterns of discrete portions 40 that are made of material $M_2^*$, each of these patterns lying in a different plane defined by functional layer 14*. Functional layer 14* also comprises a plurality of patterns of discrete portions 44 that are made of material $M_3^*$, each of these patterns lying in a different plane defined by functional layer 14*. In this embodiment, each of discrete portions 40 that are made of material $M_2^*$ and each of discrete portions 44 that are made of material $M_3^*$ is surrounded by material $M_1^*$.

Here, the patterns of discrete portions 40 that are made of material $M_2^*$ and the patterns of discrete portions 44 that are made of material $M_3^*$ are aligned with one another. As such, functional layer 14* has a plurality of areas 50 each including a sequence of discrete portions 40 that are made of material $M_2^*$ and discrete portions 44 that are made of material $M_3^*$. In this embodiment, this sequence is periodic with discrete portions 40 that are made of material $M_2^*$ alternating with discrete portions 44 that are made of material $M_3^*$. Each area 50 thus forms a superlattice-like structure in which periodicity of the sequence of discrete portions 40 that are made of material $M_2^*$ and discrete portions 44 that are made of material $M_3^*$ may be used to further modulate properties and performance characteristics of functional layer 14*. More information on effects of this periodicity can be found in an article entitled "Superlattice-like structure for phase change optical recording" by Chong, T. C. et al., *Journal of Applied Physics*, Volume 91, Issue 7, pp. 3981-3987 (2002), which is hereby incorporated by reference herein.

While in this embodiment it is made of three (3) materials, functional layer 14* may be made of more than three (3) materials in other embodiments. Also, while in this embodiment each area 50 includes a periodic sequence of discrete portions 40 that are made of material $M_2^*$ and discrete portions 44 that are made of material $M_3^*$ where these discrete portions 40 and 44 have a common thickness, in other embodiments, each area 50 may include an arbitrary sequence of discrete portions made of different materials and having different thickness.

Designing functional layer 14* with multiple areas (such as areas 50) each with a sequence of discrete portions made of different materials (such as discrete portions 40 that are made of material $M_2^*$ and discrete portions 44 that are made of material $M_3^*$) provides a further degree of freedom to modulate properties and performance characteristics of that layer.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A data storage medium comprising:
    a substrate; and
    a data storage layer supported by said substrate, said data storage layer comprising a plurality of regions each of said regions capable of representing a digital value, said data storage layer being at least partly made of a first phase-change material and a second phase-change material different from said first phase-change material, said data storage layer comprising a pattern of discrete portions made of said second phase-change material lying in a plane defined by said data storage layer, said pattern being configured such that each of said regions contains a portion made of said first phase-change material and at least one of said discrete portions made of said second phase-change material, adjacent thereto in said plane, wherein said second phase change material modulates phase change properties of said data storage layer.

2. A data storage medium as claimed in claim 1, wherein at least one of said first phase-change material and said second phase-change material is a phase-change magnetic material.

3. A data storage medium as claimed in claim 2, wherein said phase-change magnetic material is composed of at least one element selected from the group consisting of Te, Ge, Sb, Bi, Pd, Sn, As, Ag, In, Se, S, Si and P, and at least one element selected from the group consisting of Fe, Co and Ni.

4. A data storage medium as claimed in claim 2, wherein said phase-change magnetic material is selected from the group consisting of FeGeSbTe, CoGeSbTe, NiGeSbTe, $Fe(Sb_2Te_3)$, $Co(Sb_2Te_3)$, $Ni(Sb_2Te_3)$, FeGeSb, CoGeSb, NiGeSb, $Fe(Sb_{70}Te_{30})$, $Co(Sb_{70}Te_{30})$, $Ni(Sb_{70}Te_{30})$, FeInSbTe, CoInSbTe, and NiInSbTe.

5. A data storage medium as claimed in claim 1, wherein said first material is a first phase-change magnetic material and said second material is a second phase-change magnetic material different from said first phase-change magnetic material.

6. A data storage medium as claimed in claim 1, wherein said first phase-change material is composed of at least one element selected from the group consisting of Te, Ge, Sb, Bi, Pd, Sn, As, Ag, In, Se, S, Si and P.

7. A data storage medium as claimed in claim 1, wherein said phase-change material is selected from the group consisting of GeTe, InSe, InSeTl, InSeTlCo, GeTeAs, GeTeSnAu, InTe, InSeTe, InSbTe, SbSeTe, GaSbTe, $Ge_3Sb_2$, $Sb_2Te_3$, $Sb_{70}Te_{30}$, $Sb_{85}Te_5$, $Sb_{78}Te_{22}$, $Sb_{88}Te_{12}$, $Ga_{9.6}Sb_{90.4}$, $Ga_{12}Sb_{88}$, $(InSb)_{80}(GaSb)_{20}$, $Ge_8In_2$, $Ge_1Sb_1Te_2$, $Ge_1Sb_4Te_7$, $Ge_2Sb_2Te_5$, $Ge_1Sb_2Te_4$, $Ge_{14}Sb_{29}Te_{57}$, $Ge_{22}Sb_{22}Te_{56}$, $Ge_5Sb_{66.5}Te_{28.5}$, InSbTe, AgInSbTe, $Ag_3In_5Sb_{60}Te_{32}$, $Ag_5In_5Sb_{60}Te_{30}$, $Mn_5Ge_3Ga_4Sb_{70}Te_{18}$, and $(Sb_xTe_{100-x})(Ga_ySb_{100-y})_z$ where $35 \leq x \leq 80$; $40 \leq y \leq 50$; and $0.05 \leq z \leq 0.9$.

8. A data storage medium as claimed in claim 1, wherein said magnetic material is composed of at least one element selected from the group consisting of Fe, Co and Ni.

9. A data storage medium as claimed in claim 1, wherein each of said regions contains a portion made of said first phase-change material and plural ones of said discrete portions made of said second phase-change material.

10. A data storage medium as claimed in claim 1, wherein said pattern is a two-dimensional array.

11. A data storage medium as claimed in claim 1, wherein each of at least one of said discrete portions has a polygonal shape in said plane.

12. A data storage medium as claimed in claim 1, wherein each of at least one of said discrete portions has a curved shape in said plane.

13. A data storage medium as claimed in claim 1, wherein each of at least one of said discrete portions has a circular shape in said plane.

14. A data storage medium as claimed in claim 1, wherein said data storage medium is an optical data storage medium and said data storage layer is adapted to optically store data.

15. A data storage medium as claimed in claim 1, wherein said data storage medium is a magnetic data storage medium and said data storage layer is adapted to magnetically store data.

16. A data storage medium as claimed in claim 1, wherein said data storage medium is a phase-change memory and said data storage layer is adapted to store data on a basis of electrical resistivity values.

17. A data storage medium as claimed in claim 1, wherein said plane is a first plane, said data storage layer being at least partly made of a third material that is different from said first phase-change material and different from said second phase-change material, said data storage layer comprising a pattern of discrete portions made of said third material lying in a second plane defined by said data storage layer, said pattern of discrete portions made of said third material being configured such that each of said regions is at least partly made of said first phase-change material, said second phase-change material and said third material.

18. A thermal energy storage medium comprising:
a substrate; and
a thermal energy storage layer supported by said substrate and adapted to store thermal energy, said thermal energy storage layer being at least partly made of a first phase-change material and a second phase-change material different from said first phase-change material, said thermal energy storage layer comprising a pattern of discrete portions made of said second material with each portion made of said second phase change material adjacent to a discrete portion made of said first phase-change material, said pattern lying in a plane defined by said thermal energy storage layer wherein said second phase-change material modulates thermal properties of said thermal energy storage layer.

19. A sensing medium comprising:
a substrate; and
a sensing layer supported by said substrate and adapted to sense a stimulus, said sensing layer being at least partly made of a first phase-change material and a second phase-change material different from said first material, said sensing layer comprising a pattern of discrete portions made of said second material with each portion made of said second phase-change material adjacent to a discrete portion made of said first phase-change material, said pattern lying in a plane defined by said sensing layer wherein said second phase-change material modulates sensing properties of said sensing layer.

* * * * *

UNITED STATES PATENT AND TRADEMARK OFFICE
CERTIFICATE OF CORRECTION

PATENT NO.        : 7,851,779 B2                                  Page 1 of 1
APPLICATION NO.   : 11/834381
DATED             : December 14, 2010
INVENTOR(S)       : Chong et al.

It is certified that error appears in the above-identified patent and that said Letters Patent is hereby corrected as shown below:

Col. 15, Line 25, "$Ge_5Sb_{66.5}Te_{28.5}$, InSbTe," should read -- $Ge_5Sb_{66.5}Te_{28.5}$, $Ge_1Sb_1Bi_1Te_4$, InSbTe, --.

Signed and Sealed this
Tenth Day of May, 2011

David J. Kappos
*Director of the United States Patent and Trademark Office*